United States Patent
Ohno

[19]

[11] Patent Number: 5,835,281
[45] Date of Patent: *Nov. 10, 1998

[54] SIMPLIFIED ZOOM LENS

[75] Inventor: Kazunori Ohno, Saitama, Japan

[73] Assignee: Fuji Photo Optical Co., Ltd., Saitama, Japan

[*] Notice: The term of this patent shall not extend beyond the expiration date of Pat. No. 5,657,167.

[21] Appl. No.: 773,344

[22] Filed: Dec. 26, 1996

[30] Foreign Application Priority Data

Dec. 27, 1995 [JP] Japan .................................. 7-352693

[51] Int. Cl.$^6$ .............................. G02B 15/14; G02B 3/02
[52] U.S. Cl. ............................ 359/692; 359/717
[58] Field of Search ................... 359/692–686, 359/676, 713–717, 795

[56] References Cited

U.S. PATENT DOCUMENTS 5,638,210  6/1997  Sato et al. ............................... 359/689
5,657,167  8/1997  Ohno ...................................... 359/717

*Primary Examiner*—Georgia Y. Epps
*Assistant Examiner*—Jordan M. Schwartz
*Attorney, Agent, or Firm*—Young & Thompson

[57] ABSTRACT

A zoom lens comprising, from the object end, a positive power first lens having a convex image side surface and a negative power second lens having a curvature on a concave object side surface larger than on an image side surface, the first and second lenses being movable relative to each other to vary the focal length of the zoom lens, the zoom lens satisfying the following relations:

$$0.05 < d_1/f_w < 0.20$$

$$-0.25 < R_2/f_w < -0.15$$

$$-0.65 < R_3/f_w < -0.35$$

where $d_1$ is the axial distance between the surfaces of the first lens;

$f_w$ is the focal length at the wide angle end of the whole zoom lens;

$R_2$ is the radius of curvature of the image side surface of the first lens; and $R_3$ is the radius of curvature of the object side surface of the second lens.

10 Claims, 13 Drawing Sheets

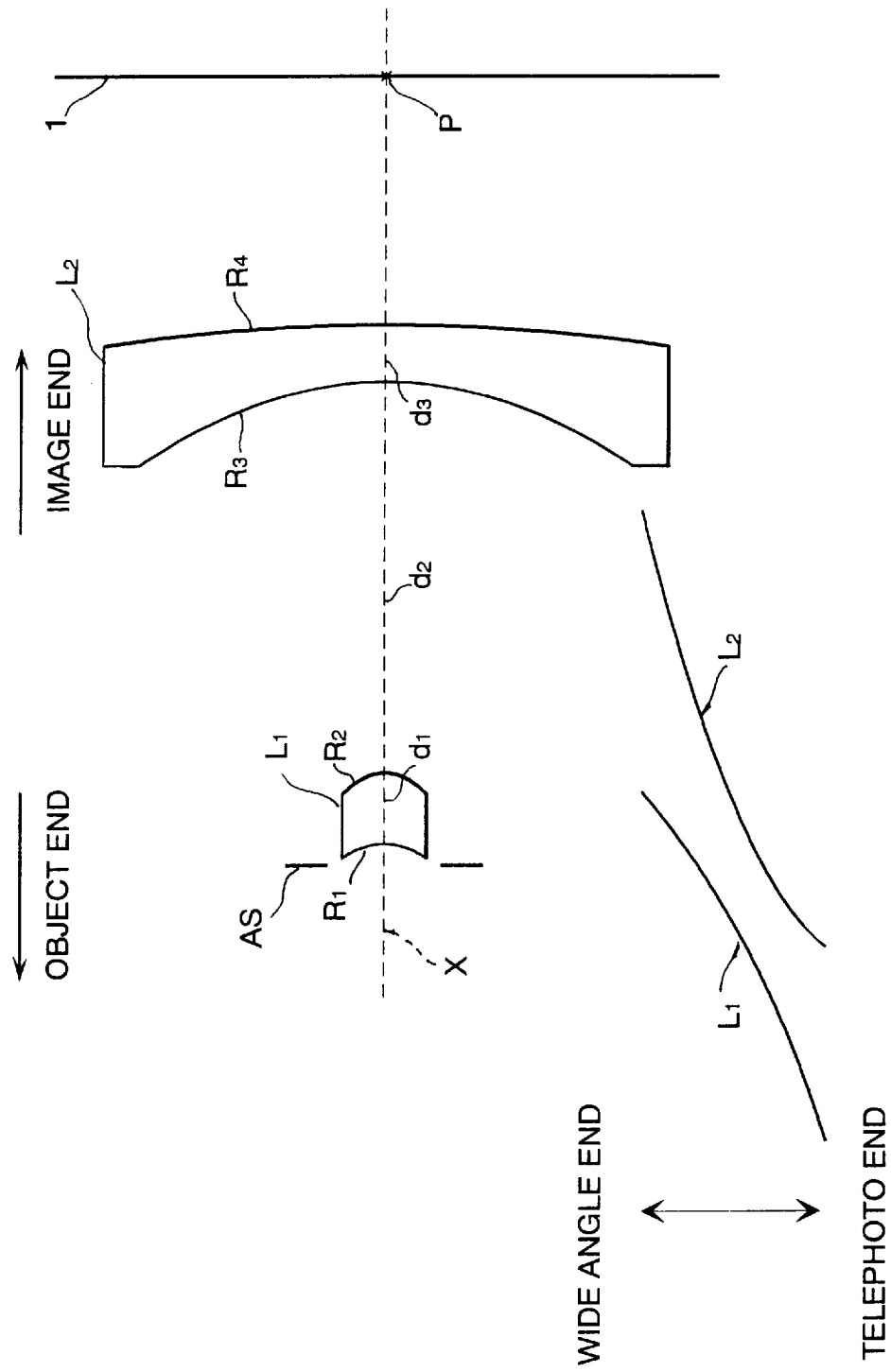

SIMPLIFIED ZOOM LENS

BACKGROUND OF THE INVENTION

1. Field of the Invention

This invention relates to a simplified zoom lens, and, more particularly, to a simplified two-component zoom lens suitable for a low priced compact camera.

2. Description of Related Art

In recent years, there has been a remarkable tendency to install zoom lenses, in particular high powered zoom lenses, wide angle zoom lenses, close-up zoom lens and the like, to compact cameras. As a result, while such a compact camera is functionally sophisticated, nevertheless, the compact camera imposes various operational constraints on users and causes the users to experience operational inconvenience. Furthermore, because of the functional sophistication, the compact cameras are not always low-priced, and there are strong user's demands for compact cameras capable of being easily operated by ordinary users.

Various zoom lenses have been developed in order to meet the user's demands. In particular, zoom lenses known from, for instance, Japanese Unexamined Patent Publications Nos. 3-127008, 3-127014 and 3-158815 are shortened in overall length and incorporate compact zoom lenses, one of which is a three-element lens system comprised of a two-lens element front group and a single-lens element rear group, and another is a two-element lens system comprised of a single-element front group and a single-element rear group.

The prior art zoom lenses, however, include at least one lens having a great axial thickness which is always undesirable for compactness. Further, more-than-one aspheric lenses produce technical difficulties in lens manufacture and still have need of improvement in optical and mechanical design and manufacturing cost reduction. Furthermore, since the prior art zoom lens has a zoom range in which any varied focal length is rather close to that of telephoto lenses, the lens system is somewhat large, making the camera less compact than desired.

SUMMARY OF THE INVENTION

It is, therefore, an object of the invention to provide a simplified zoom lens which is compact and reduces the production costs thereof.

The above object of the invention is achieved by providing a simplified zoom lens which consists of two lens groups, namely a front lens group and a rear lens group, each lens group including a single lens element having a small axial distance between surfaces and having a zoom range in which any equivalent focal length of the zoom lens is rather close to those of wide angle lenses. This zoom lens provides the desired overall length and compactness thereof. Further, the zoom lens includes aspheric lens surfaces, the number of which is made as small as possible to improve the productivity of zoom lenses.

According to preferred embodiments of the invention, a zoom lens comprises, from the object end, a first lens element of positive refractive power which consists of a meniscus lens having a convex image side surface and a second lens element of negative refractive power which has a curvature on a concave object side surface larger than on an image side surface, which are movable relative to each other to vary the focal length of the zoom lens. The zoom lens satisfies the following relations $0.05 < d_1/f_w < 0.20$ $-0.25 < R_2/f_w < -0.15$ $-0.65 < R_3/f_w < -0.35$ where $d_1$ is the axial distance between the surfaces of the first lens element;

$f_w$ is the focal length at the wide angle end of the whole zoom lens;

$R_2$ is the radius of curvature of the image side surface of the first lens element; and $R_3$ is the radius of curvature of the object side surface of the second lens element.

The zoom lens may include aspheric surfaces at both sides of the first lens element, and spherical surfaces at both sides of the second lens element.

Furthermore, the zoom lens may include plastic lenses for both first and second lens elements.

BRIEF DESCRIPTION OF THE DRAWINGS

The above and other objects and features of the invention will be clearly understood from the following description with respect to a preferred embodiment thereof when considered in conjunction with the accompanying drawings, in which:

FIG. 1 is a diagrammatic side view of a zoom lens embodying the invention;

DETAILED DESCRIPTION OF THE SPECIFIC EMBODIMENTS

Figure 2C:
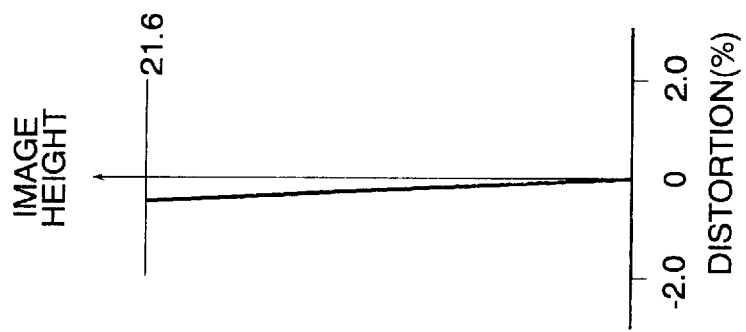
FIG. 2C is a diagram showing distortion of the zoom lens described in Table I at the wide angle end or the shortest equivalent focal length.

Referring to the drawings in detail, a zoom lens embodying the invention as exemplified in FIG. 1 includes, in order from the object end, a positive power first lens element $L_1$ and a negative power second lens element $L_2$. These two lens elements $L_1$ and $L_2$ are movable along the optical axis X relative to each other and also relative to a focal plane 1 for varying the focal length F of the entire zoom lens during zooming and forming a clear image of an object on the focal plane 1. An aperture stop AS, which may be of a variable aperture type or of a fixed aperture type, is disposed immediately before the first lens element $L_1$. If a fixed aperture type of aperture stop AS is installed in the zoom lens suitable for simplified compact cameras, it may be disposed at an appropriate distance either in front of or after the first lens element $L_1$.

Each lens element $L_1$, $L_2$ is further preferable to be made of plastic.

A zoom lens embodying the invention comprises a first lens element $L_1$ consisting of a meniscus lens having a convex image side surface and a second lens element $L_2$ consisting of a meniscus lens having a concave object side surface whose radius of curvature is greater than that of the image side surface and may be designed for various focal length ranges by satisfying the following conditions:

$$0.05 < d_1/f_w < 0.20 \tag{I}$$

$$-0.25 < R_2/f_w < -0.15 \tag{II}$$

$$-0.65 < R_3/f_w < -0.35 \tag{III}$$

where $d_1$ is the axial distance between the surfaces of the first lens element $L_1$;

$f_w$ is the focal length at the wide angle end of the whole zoom lens;

$R_2$ is the radius of curvature of the image side surface of the first lens element $L_1$; and $R_3$ is the radius of curvature of the object side surface of the second lens element $L_2$.

The zoom lens embodying the invention may preferably has aspheric surfaces on the first lens element $L_1$. The aspherical surfaces may be defined by the following equation:

$$Z = CY^2/\{1+(1-[1+K]C^2Y^2)^{1/2}\} + A_2Y^4 + A_3Y^6 + A_4Y^8 + A_5Y^{10}$$

where

Z is the surface sag at a semi-aperture distance from the axis X of the lens system;

C is the curvature of a lens surface at the optical axis;

K is a conic constant; and $A_2$, $A_3$, $A_4$ and $A_5$ are aspheric coefficients.

The parameters set forth are necessary for compactness and suitably balanced and satisfactorily corrected aberrations of the zoom lens.

The first parameter ($0.05 < d_1/f_w < 0.20$) provides the relationship between the axial distance $d_1$ between lens surfaces of the first lens element $L_1$ with respect to the focal length of the whole zoom lens at the wide angle end. If the lower limit is exceeded, while the overall length of the zoom lens becomes sufficiently short and yields satisfactory compactness of the zoom lens, nevertheless, it becomes difficult to prevent or significantly reduce aggravation of spherical aberration and coma aberration due to an increase in negative curvature of each lens surface of the first lens element $L_1$ resulting from suppressing aggravation of the curvature of field of the zoom lens which is amplified with an increase in angle of view at the wide angle end. For this reason, it is hard to apportion correction of spherical aberration and curvature of field between the respective surfaces even if being formed as aspheric surfaces, resulting in no improvement in optical performance. On the other hand, if the upper limit is significantly exceeded, while the first lens element $L_1$ shows an improved optical performance, it has to have a large axial distance between the surfaces. Consequently, the first lens element $L_1$, if molded as an aspheric glass lens element or formed as an aspheric plastic lens element, potentially needs a long processing time and is accompanied by occurrences of internal strain. In addition, even the second lens element $L_2$ must be small in curvature for correction of distortions and consequently large in diameter, resulting in unsatisfied compactness of the zoom lens.

The second parameter ($-0.25 < R_2/f_w < -0.15$) provides the relationship between the paraxial radius of curvature of the image side surface of the first lens element $L_1$ and focal length at the wide angle end of the whole zoom lens. While, if the lower limit is exceeded, the zoom lens is improved in optical performance, in order for the zoom lens to be corrected sufficiently in curvature of field, the first lens element $L_1$ should have a large axial distance $d_1$ between the surfaces, which makes the first condition (I) unsatisfied and makes it hard to produce the first lens element $L_1$ with an increased production efficiency and provide a compact zoom lens. On the other hand, if the upper limit is exceeded, the first lens element $L_1$ must have a small negative radius of curvature. This is advantageous to correction of curvature of field and, however, causes aggravation of spherical aberration and coma aberration, leading to an unsatisfied optical performance of the zoom lens.

The third parameter ($-0.65 < R_3/f_w < -0.35$) provides the relationship between the paraxial radius of curvature of the object side surface of the second lens element $L_2$ and focal length at the wide angle end of the whole zoom lens. If the lower limit is exceeded, because the zoom lens produces aggravation of curvature of field at the wide angle end unless the second lens element $L_2$ has a small negative refractive power, distances which both first and second lens elements $L_1$ and $L_2$ move become long, which makes it difficult to provide compactness of the zoom lens. On the other hand, if the upper limit is exceeded, it is hard to correct aberrations, such as curvature of field, sufficiently unless the first lens element $L_1$ has a small radius of curvature on each surface, which produces aggravation of spherical aberration and coma aberration of the zoom lens.

It may be possible to incorporate a lens having a spherical surface at each side thereof or as a lens having an aspheric surface at either one side thereof as the first lens element $L_1$ in the zoom lens. In this instance, however, it is difficult to achieve sufficiently high F-numbers (brightness) FNO and/or high zoom ratios, such as higher than 1.3, necessary for the zoom lens to satisfy desired optical performance. Further, each of the first and second lens elements $L_1$ and $L_2$ may have an aspheric surface at either one side thereof. In this instance, however, the zoom lens consisting of, in particular, a single lens element for each of the front and rear lens groups produces sharp changes in aberrations due to zooming unless each of the first and second lens elements $L_1$ and $L_2$ are corrected in spherical aberration and curvature of field to a certain extent, resulting in an unrealistic zoom lens. Accordingly, to utilize a bi-aspheric lens and a bi-spherical lens as the first and second lens elements $L_1$ and $L_2$ is one of necessary requirements for the zoom lens to improve its optical performance and decrease production costs.

To utilize plastic lenses as the first and second lens elements $L_1$ and $L_2$ decrease production costs of the zoom lens. While the zoom lens including plastic lenses possibly experiences shifts in focal point due to changes in environmental temperature and humidity, because the zoom lens has a zoom range in which any varied focal length is rather close to those of wide angle lenses, a shift in focal point is reduced to an extent such as to be disregarded. Furthermore, because the zoom lens reduces its brightness at the telephoto end where a shift in focal point is somewhat large and has a large depth of focus, a shift in focal point is significantly reduced. For these reasons, there is not the least apprehension of causing practical problems of the zoom lens due to the utilization of plastic lenses.

The simplified zoom lens of the invention provides a practically satisfactory optical performance in that the focal length of the whole zoom lens is in a range of approximately 29 to 32 mm at the wide angle end and the zoom ratio is between approximately 1.8 and 2.0.

The following example described in tables are exemplary of zoom lenses embodying the invention. In the following prescription tables, the reference L followed by an Arabic numeral indicates the lens elements progressively from the object end to the image end of the lens. The reference radius numbers $R_x$ are the progressive lens surface radii. Positive surface radii are struck from the right of the lens surface on the optical axis X. Negative radii are struck from the left of the lens surface on the optical axis X. $N_d$ is the index of refraction of the lens element. $u_d$ is the dispersion of the lens element as measured by the Abbe number. The reference distance numbers $d_x$ are the progressive axial distances between adjacent lens surfaces. In each Table, the surface accompanied by an asterisk (*) is aspheric.

A zoom lens as shown in FIG. 1 scaled to equivalent focal length of the zoom lens of 32.804 mm to 54.085 mm is substantially described in Table I.

TABLE I

| Element | Surface | Radius(mm) | Axial Distance Between Surfaces | $N_d$ | $U_d$ |
|---|---|---|---|---|---|
| L1 | S1* | $R_1 = -9.3662$ | $d_1 = 3.500$ | 1.49023 | 57.6 |
|    | S2* | $R_2 = -5.9102$ | $d_2 = $ Variable | | |
| L2 | S3 | $R_3 = -18.1506$ | $d_3 = 2.125$ | 1.53522 | 40.6 |
|    | S4 | $R_4 = -171.8729$ | | | |

Aspheric Surface: S1 and S2
Aspheric Coefficients:

| | S1 | S2 |
|---|---|---|
| $A_2$ | $-3.4437 \times 10^{-4}$ | $5.0877 \times 10^{-5}$ |
| $A_3$ | $8.0329 \times 10^{-10}$ | $-2.6558 \times 10^{-9}$ |
| $A_4$ | $0.0010 \times 10^{-15}$ | $-2.2455 \times 10^{-15}$ |
| $A_5$ | $4.4926 \times 10^{-20}$ | $6.2577 \times 10^{-19}$ |

Conic Constant:

| K | 5.8614 | 0.4616 |
|---|---|---|

Curvature:

| C | $-0.106767$ | $-0.169200$ |
|---|---|---|

The zoom lens described in Table I has various optical dimensions at the wide angle end (W), the middle position (M), and the telephoto end (T) as follows:

|  | W | M | T |
|---|---|---|---|
| Zoom Spacing: $d_2$(mm) | 18.050 | 11.750 | 6.850 |
| EFL(mm) | 32.804 | 42.128 | 54.085 |
| BF(mm) | 11.324 | 25.837 | 44.085 |
| $F_{NO}$ | 6.4 | 8.3 | 10.6 |
| $2\omega$ | 66.8° | 54.4° | 43.6° |

| $f_1$ | $f_2$ | $d_1/f_w$ | $R_2/f_w$ | $R_3/f_w$ |
|---|---|---|---|---|
| 24.51 | −37.96 | 0.1067 | −0.1802 | −0.5533 |

In the above table, EFL, BF and $2\omega$ indicate the equivalent focal length, backfocal length and angle of view of the zoom lens at each of the wide angle end, middle position and telephoto end.

As apparent from the above table, the zoom lens described in Table I satisfies all of the conditions (I), (II) and (III).

A zoom lens as shown in FIG. 1 scaled to equivalent focal length of the zoom lens of 28.949 mm to 49.036 mm is substantially described in Table II.

TABLE II

| Element | Surface Radius(mm) | Axial Distance Between Surfaces | $N_d$ | $U_d$ |
|---|---|---|---|---|
| $L_1$ S1* | $R_1 = -7.6119$ | | | |
|  | | $d_1 = 2.500$ | 1.49023 | 57.6 |
| S2* | $R_2 = -5.0130$ | | | |
|  | | $d_2$ = Variable | | |
| $L_2$ S3 | $R_3 = -16.6158$ | | | |
|  | | $d_3 = 2.000$ | 1.53522 | 40.6 |
| S4 | $R_4 = -132.2790$ | | | |

Aspheric Surface: S1 and S2
Aspheric Coefficients:

|  | S1 | S2 |
|---|---|---|
| $A_2$ | $7.4641 \times 10^{-5}$ | $3.0795 \times 10^{-4}$ |
| $A_3$ | $-1.2925 \times 10^{-4}$ | $-1.0673 \times 10^{-4}$ |
| $A_4$ | $-1.9060 \times 10^{-5}$ | $1.2361 \times 10^{-5}$ |
| $A_5$ | $-2.2388 \times 10^{-8}$ | $-5.7955 \times 10^{-7}$ |

Conic Constant:

| K | 5.8727 | 0.5102 |

Curvature:

| C | −0.131373 | −0.199481 |

The zoom lens described in Table II has various optical dimensions at the wide angle end (W), the middle position (M), and the telephoto end (T) as follows:

|  | W | M | T |
|---|---|---|---|
| Zoom Spacing: $d_2$(mm) | 17.750 | 11.750 | 6.250 |
| EFL(mm) | 28.949 | 36.818 | 49.036 |
| BF(mm) | 8.232 | 20.586 | 39.770 |
| $F_{NO}$ | 6.3 | 8.0 | 10.7 |
| $2\omega$ | 73.5° | 60.9° | 47.6° |

| $f_1$ | $f_2$ | $d_1/f_w$ | $R_2/f_w$ | $R_3/f_w$ |
|---|---|---|---|---|
| 22.75 | −35.53 | 0.0864 | −0.1732 | −0.5740 |

In the above table EFL, BF and $2\omega$ indicate the equivalent focal length, backfocal length and angle of view of the zoom lens at each of the wide angle end, middle position and telephoto end.

As apparent from the above table, the zoom lens described in Table II satisfies all of the conditions (I), (II) and (III).

A zoom lens as shown in FIG. 1 scaled to equivalent focal length of the zoom lens of 31.999 mm to 53.998 mm is substantially described in Table III.

TABLE III

| Element | Surface Radius(mm) | Axial Distance Between Surfaces | $N_d$ | $U_d$ |
|---|---|---|---|---|
| $L_1$ S1* | $R_1 = -12.9860$ | | | |
|  | | $d_1 = 5.000$ | 1.49023 | 57.6 |
| S2* | $R_2 = -7.0713$ | | | |
|  | | $d_2$ = Variable | | |
| $L_2$ S3 | $R_3 = -19.0510$ | | | |
|  | | $d_3 = 2.125$ | 1.53522 | 40.6 |
| S4 | $R_4 = -216.2229$ | | | |

Aspheric Surface: S1 and S2
Aspheric Coefficients:

|  | S1 | S2 |
|---|---|---|
| $A_2$ | $-3.3939 \times 10^{-4}$ | $1.7389 \times 10^{-4}$ |
| $A_3$ | $2.6398 \times 10^{-5}$ | $1.4162 \times 10^{-6}$ |
| $A_4$ | $-1.1620 \times 10^{-5}$ | $-2.2455 \times 10^{-15}$ |
| $A_5$ | $7.9416 \times 10^{-7}$ | $1.2614 \times 10^{-8}$ |

Conic Constant:

| K | 5.9701 | 0.6652 |

Curvature:

| C | −0.077006 | −0.141412 |

The zoom lens described in Table III has various optical dimensions at the wide angle end (W), the middle position (M), and the telephoto end (T) as follows:

|  | W | M | T |
|---|---|---|---|
| Zoom Spacing: $d_2$(mm) | 19.211 | 11.750 | 6.850 |
| EFL(mm) | 31.999 | 42.434 | 53.998 |
| BF(mm) | 9.898 | 26.393 | 44.679 |
| $F_{NO}$ | 6.4 | 8.5 | 10.8 |
| $2\omega$ | 68.1° | 54.0° | 43.7° |

| $f_1$ | $f_2$ | $d_1/f_w$ | $R_2/f_w$ | $R_3/f_w$ |
|---|---|---|---|---|
| 24.78 | −39.18 | 0.1563 | −0.2210 | −0.5954 |

In the above table EFL, BF and $2\omega$ indicate the equivalent focal length, backfocal length and angle of view of the zoom lens at each of the wide angle end, middle position and telephoto end.

As apparent from the above table, the zoom lens described in Table III satisfies all of the conditions (I), (II) and (III).

A zoom lens as shown in FIG. 1 scaled to equivalent focal length of the zoom lens of 29.000 mm to 53.999 mm is substantially described in Table IV.

TABLE IV

| Element | Surface Radius(mm) | Axial Distance Between Surfaces | $N_d$ | $U_d$ |
|---|---|---|---|---|
| $L_1$ S1* | $R_1 = -14.1534$ | | | |
|  | | $d_1 = 5.000$ | 1.49023 | 57.6 |
| S2* | $R_2 = -6.5630$ | | | |
|  | | $d_2$ = Variable | | |
| $L_2$ S3 | $R_3 = -11.8374$ | | | |
|  | | $d_3 = 2.125$ | 1.49023 | 57.6 |
| S4 | $R_4 = -170.7822$ | | | |

TABLE IV-continued

Aspheric Surface: S1 and S2
Aspheric Coefficients:

|  | S1 | S2 |
|---|---|---|
| $A_2$ | $-5.8333 \times 10^{-4}$ | $2.5623 \times 10^{-4}$ |
| $A_3$ | $4.3322 \times 10^{-5}$ | $-5.3181 \times 10^{-7}$ |
| $A_4$ | $-1.1704 \times 10^{-5}$ | $-2.2455 \times 10^{-15}$ |
| $A_5$ | $3.2780 \times 10^{-7}$ | $3.5746 \times 10^{-8}$ |

Conic Constant:

| K | 8.0831 | 0.7070 |
|---|---|---|

Curvature:

| C | $-0.070654$ | $-0.152369$ |
|---|---|---|

The zoom lens described in Table IV has various optical dimensions at the wide angle end (W), the middle position (M), and the telephoto end (T) as follows:

|  | W | M | T |
|---|---|---|---|
| Zoom Spacing: $d_2$(mm) | 15.385 | 13.250 | 6.850 |
| EFL(mm) | 29.000 | 37.386 | 53.999 |
| BF(mm) | 9.236 | 19.886 | 40.988 |
| $F_{NO}$ | 5.8 | 7.49 | 10.8 |
| $2\omega$ | 73.4° | 60.0° | 43.6° |

| $f_1$ | $f_2$ | $d_1/f_W$ | $R_2/f_W$ | $R_3/f_W$ |
|---|---|---|---|---|
| 20.52 | −26.06 | 0.1724 | −0.2263 | −0.4082 |

In the above table EFL, BF and 2ω indicate the equivalent focal length, backfocal length and angle of view of the zoom lens at each of the wide angle end, middle position and telephoto end.

As apparent from the above table, the zoom lens described in Table IV satisfies all of the conditions (I), (II) and (III).

Figure 2B:
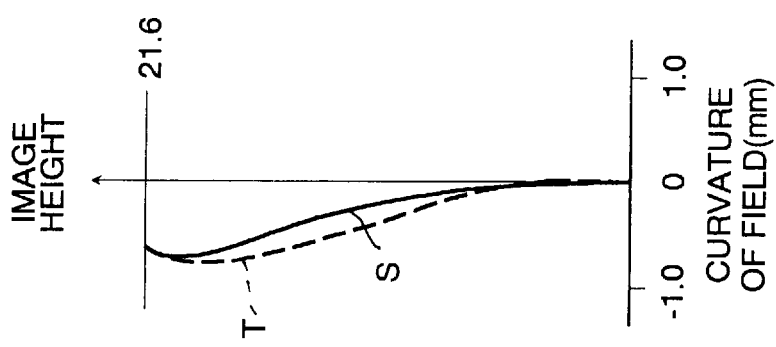
FIG. 2B is a diagram showing curvature of field in sagittal (S) and tangential (T) image surfaces of the zoom lens described in Table I at the wide angle end or the shortest equivalent focal length.
Figure 2A:
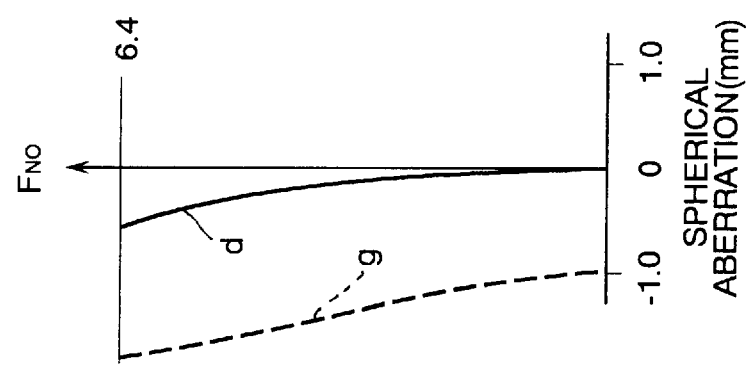
FIG. 2A is a diagram showing spherical aberrations of the zoom lens described in Table I at the wide angle end or the shortest equivalent focal length.
Figure 3C:
FIG. 3C is a diagram showing distortion of the zoom lens described in Table I at the wide middle equivalent focal length.
Figure 3B:
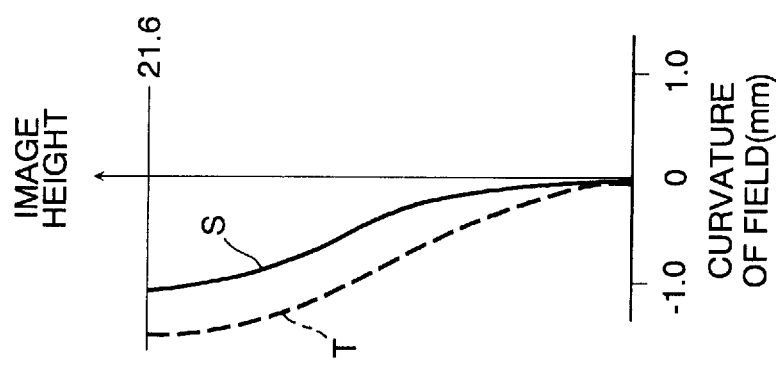
FIG. 3B is a diagram showing curvature of field in sagittal (S) and tangential (T) image surfaces of the zoom lens described in Table I at the middle equivalent focal length.
Figure 3A:
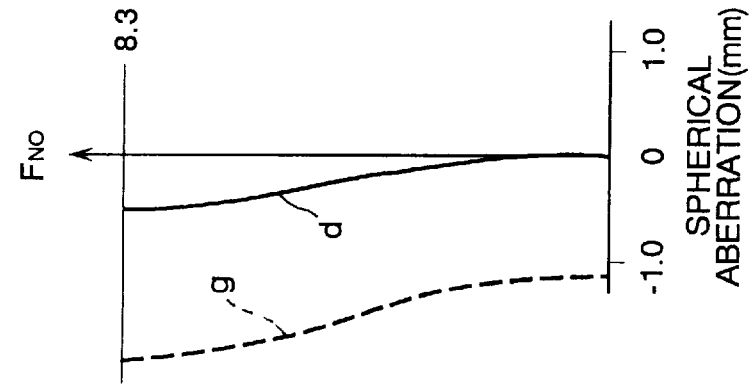
FIG. 3A is a diagram showing spherical aberrations of the zoom lens described in Table I at the middle equivalent focal length.
Figure 4C:
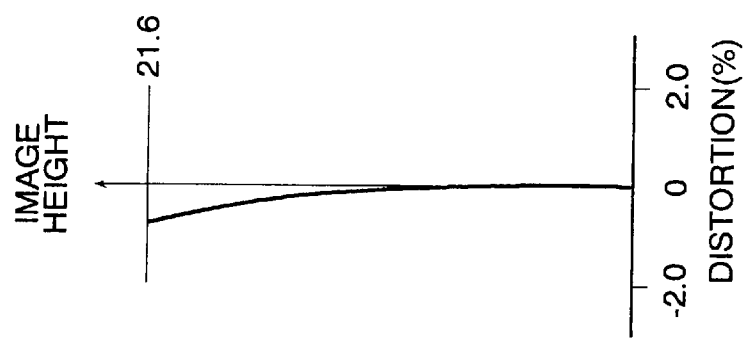
FIG. 4C is a diagram showing distortion of the zoom lens described in Table I at the telephoto end or the longest equivalent focal length.
Figure 4B:
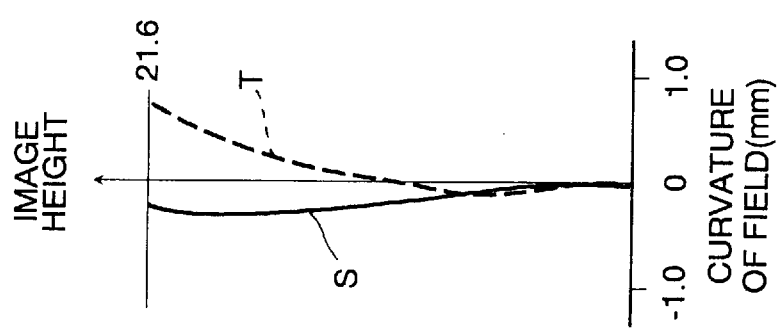
FIG. 4B is a diagram showing curvature of field in sagittal (S) and tangential (T) image surfaces of the zoom lens described in Table I at the telephoto end or the longest equivalent focal length.
Figure 4A:
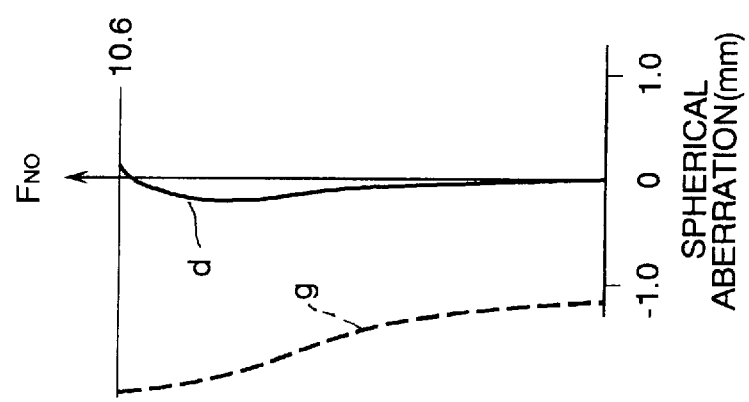
FIG. 4A is a diagram showing spherical aberrations of the zoom lens described in Table I at the telephoto end or the longest equivalent focal length.
Figure 5C:
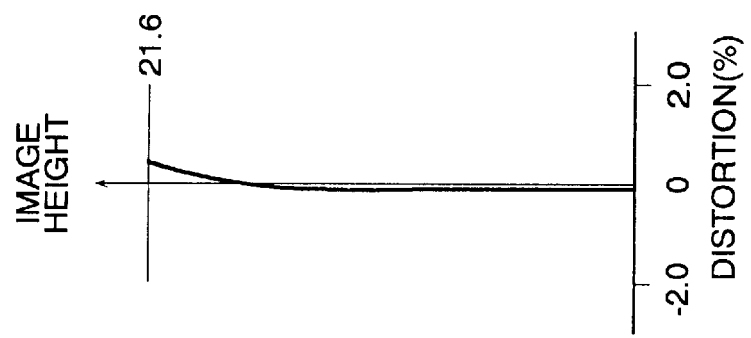
FIG. 5C is a diagram showing distortion of the zoom lens described in Table II at the wide angle end or the shortest equivalent focal length.
Figure 5B:
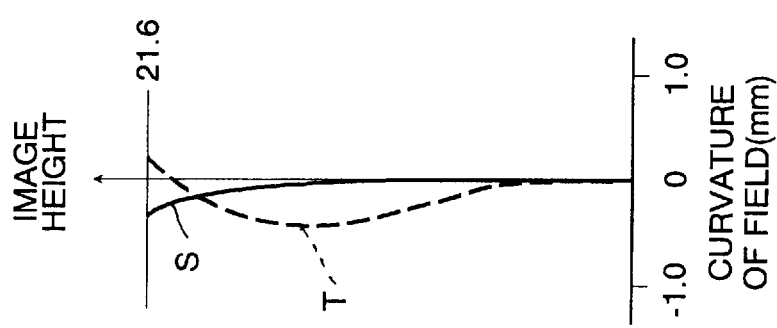
FIG. 5B is a diagram showing curvature of field in sagittal (S) and tangential (T) image surfaces of the zoom lens described in Table II at the wide angle end or the shortest equivalent focal length.
Figure 5A:
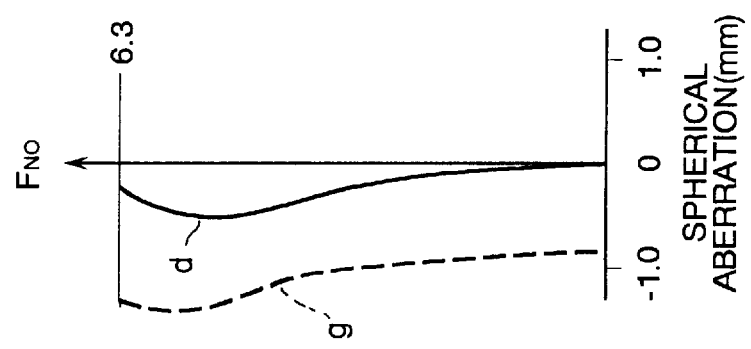
FIG. 5A is a diagram showing spherical aberrations of the zoom lens described in Table II at the wide angle end or the shortest equivalent focal length.
Figure 6C:
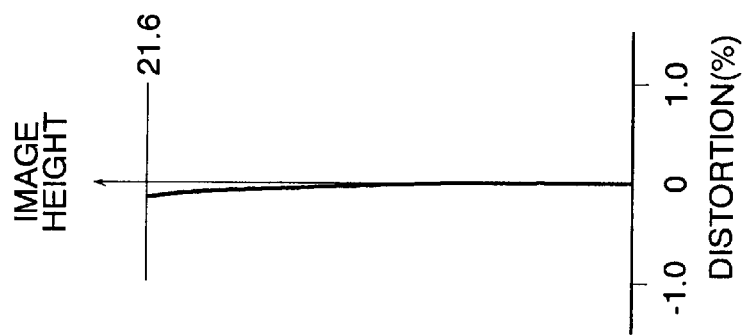
FIG. 6C is a diagram showing distortion of the zoom lens described in Table II at the wide middle equivalent focal length.
Figure 6B:
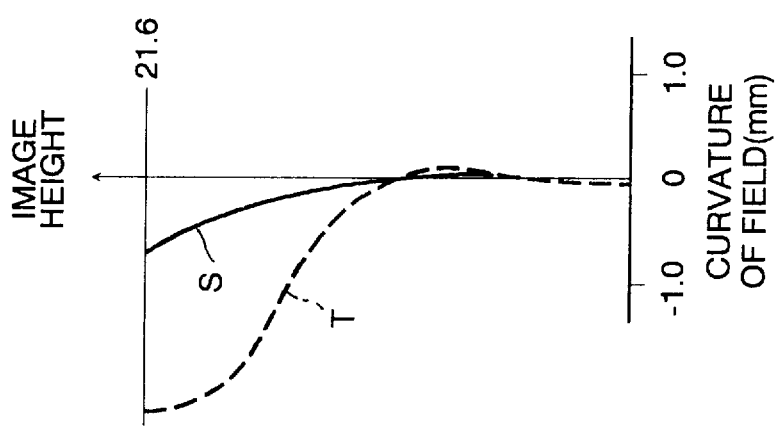
FIG. 6B is a diagram showing curvature of field in sagittal (S) and tangential (T) image surfaces of the zoom lens described in Table II at the middle equivalent focal length.
Figure 6A:
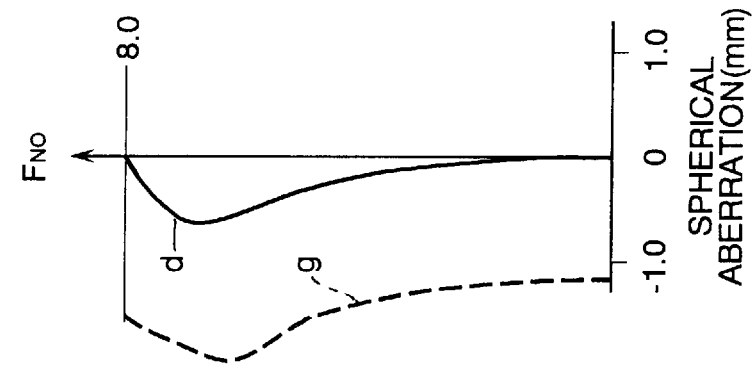
FIG. 6A is a diagram showing spherical aberrations of the zoom lens described in Table II at the middle equivalent focal length.
Figure 7C:
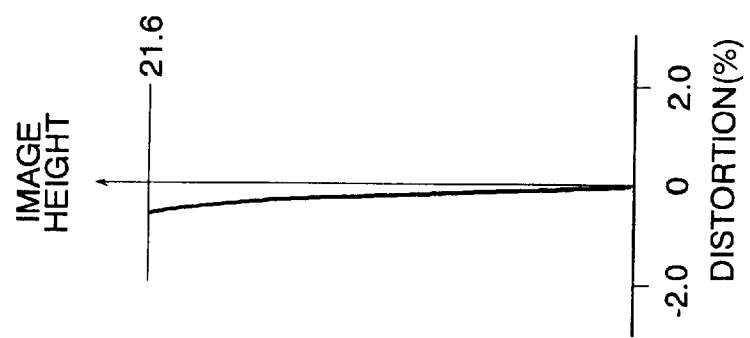
FIG. 7C is a diagram showing distortion of the zoom lens described in Table II at the telephoto end or the longest equivalent focal length.
Figure 7B:
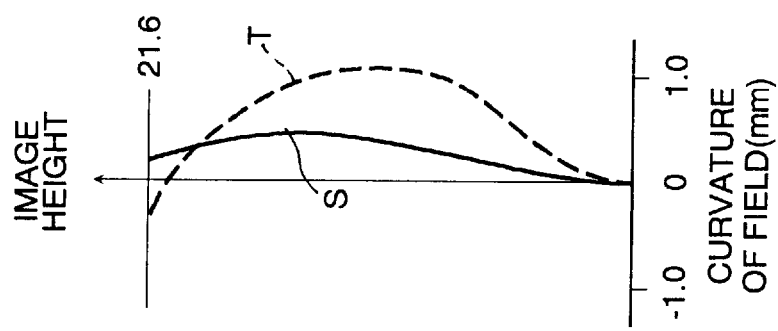
FIG. 7B is a diagram showing curvature of field in sagittal (S) and tangential (T) image surfaces of the zoom lens described in Table II at the telephoto end or the longest equivalent focal length.
Figure 7A:
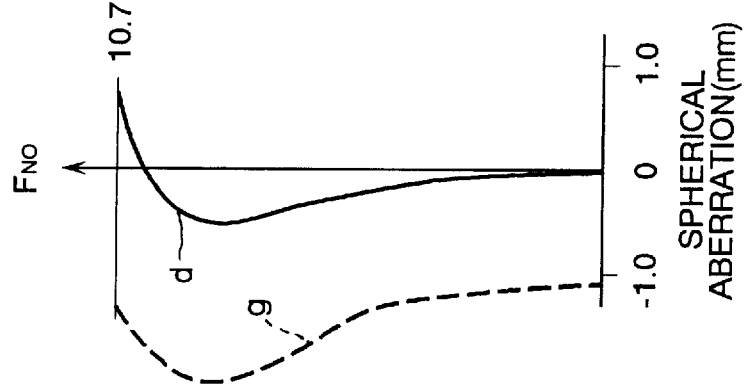
FIG. 7A is a diagram showing spherical aberrations of the zoom lens described in Table II at the telephoto end or the longest equivalent focal length.
Figure 8C:
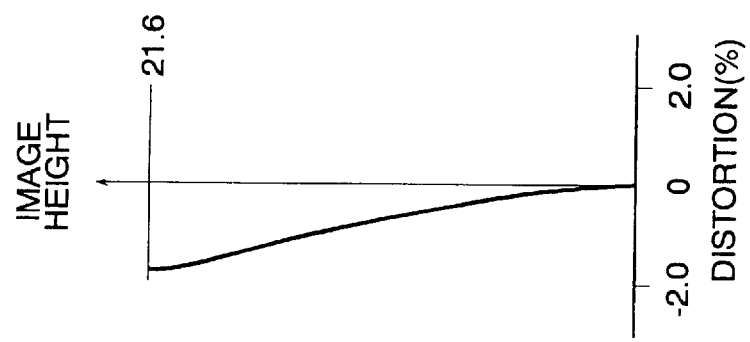
FIG. 8C is a diagram showing distortion of the zoom lens described in Table III at the wide angle end or the shortest equivalent focal length.
Figure 8B:
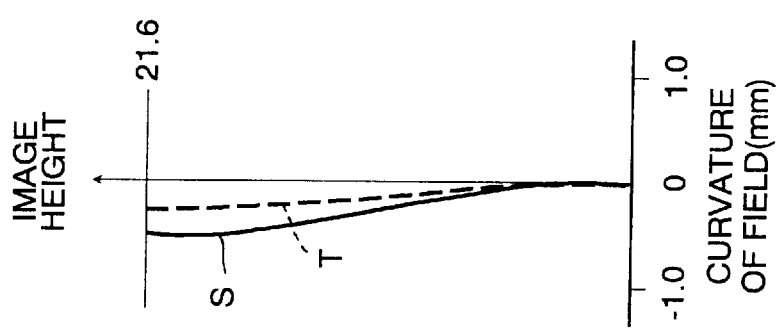
FIG. 8B is a diagram showing curvature of field in sagittal (S) and tangential (T) image surfaces of the zoom lens described in Table III at the wide angle end or the shortest equivalent focal length.
Figure 8A:
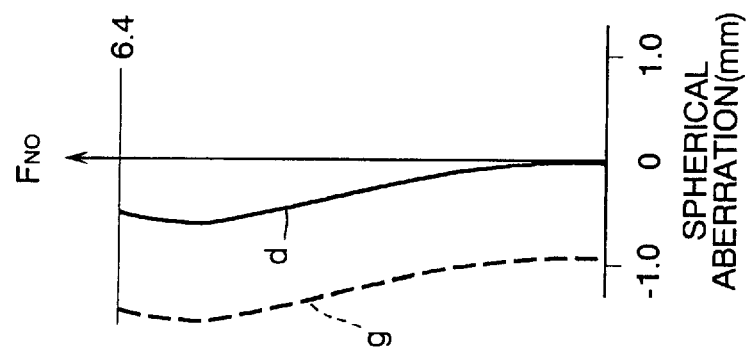
FIG. 8A is a diagram showing spherical aberrations of the zoom lens described in Table III at the wide angle end or the shortest equivalent focal length.
Figure 9C:
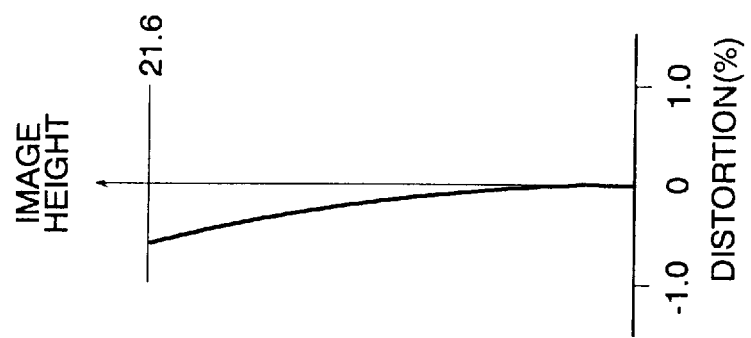
FIG. 9C is a diagram showing distortion of the zoom lens described in Table III at the wide middle equivalent focal length.
Figure 9B:
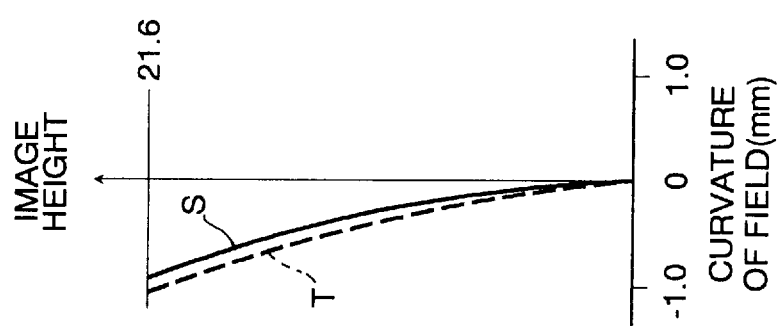
FIG. 9B is a diagram showing curvature of field in sagittal (S) and tangential (T) image surfaces of the zoom lens described in Table III at the middle equivalent focal length.
Figure 9A:
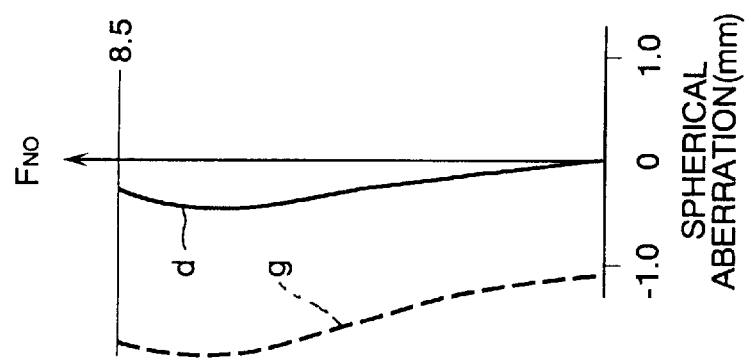
FIG. 9A is a diagram showing spherical aberrations of the zoom lens described in Table III at the middle equivalent focal length.
Figure 10C:
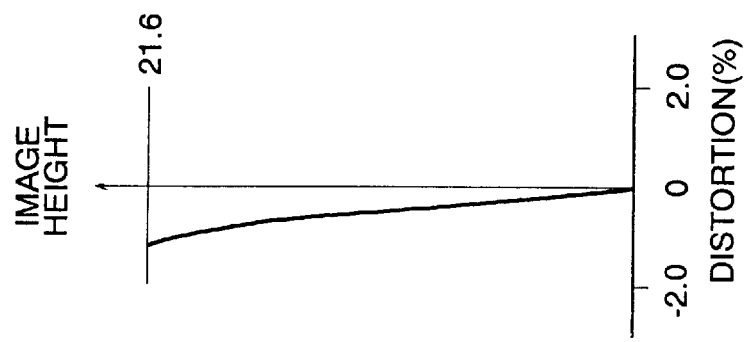
FIG. 10C is a diagram showing distortion of the zoom lens described in Table III at the telephoto end or the longest equivalent focal length.
Figure 10B:
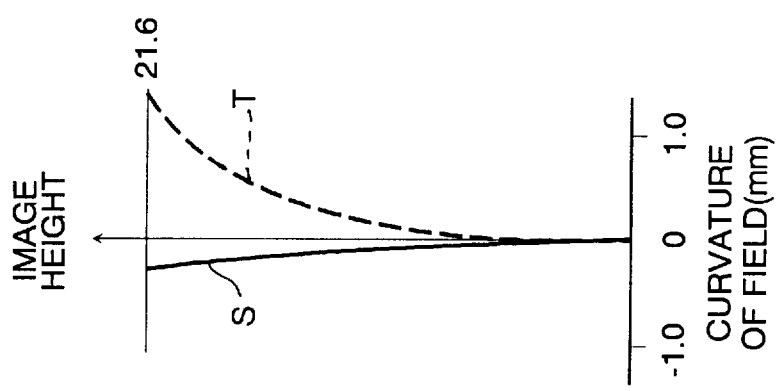
FIG. 10B is a diagram showing curvature of field in sagittal (S) and tangential (T) image surfaces of the zoom lens described in Table III at the telephoto end or the longest equivalent focal length.
Figure 10A:
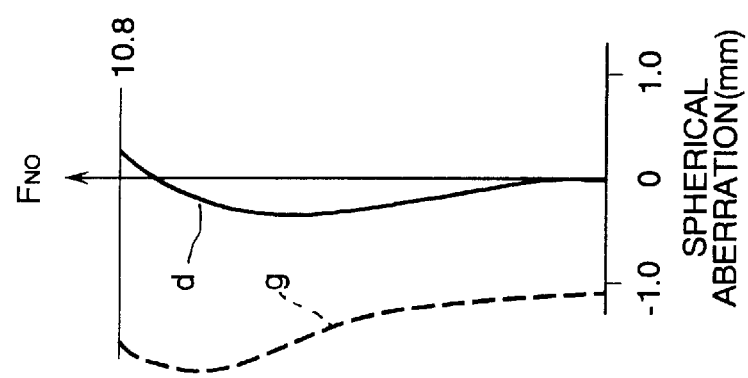
FIG. 10A is a diagram showing spherical aberrations of the zoom lens described in Table III at the telephoto end or the longest equivalent focal length.
Figure 11C:
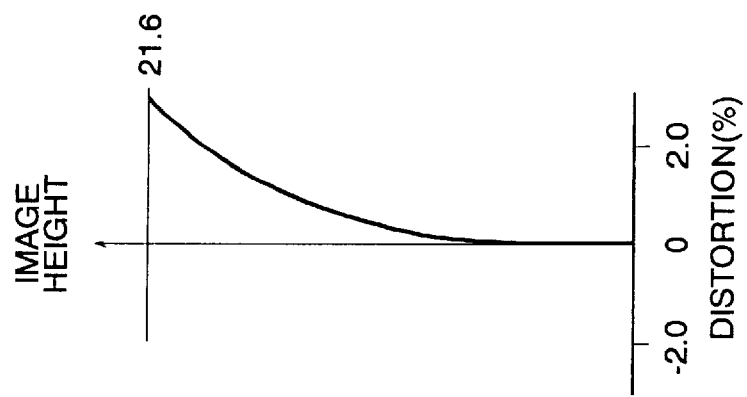
FIG. 11C is a diagram showing distortion of the zoom lens described in Table IV at the wide angle end or the shortest equivalent focal length.
Figure 11B:
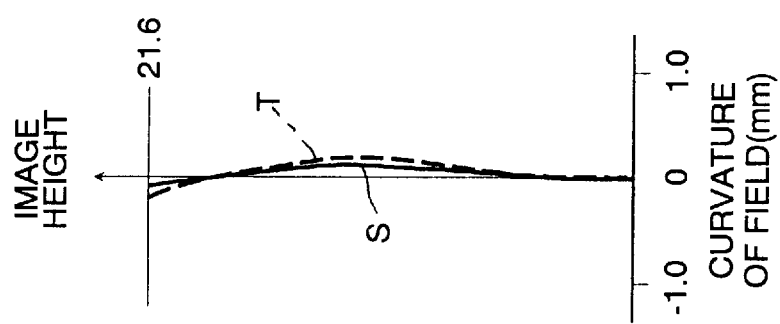
FIG. 11B is a diagram showing curvature of field in sagittal (S) and tangential (T) image surfaces of the zoom lens described in Table IV at the wide angle end or the shortest equivalent focal length.
Figure 11A:
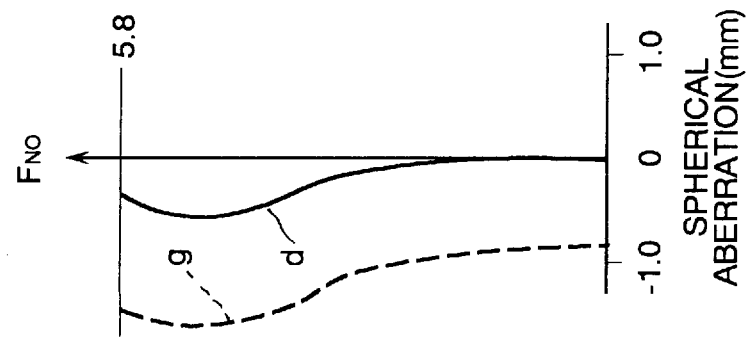
FIG. 11A is a diagram showing spherical aberrations of the zoom lens described in Table IV at the wide angle end or the shortest equivalent focal length.
Figure 12C:
FIG. 12C is a diagram showing distortion of the zoom lens described in Table IV at the wide middle equivalent focal length.
Figure 12B:
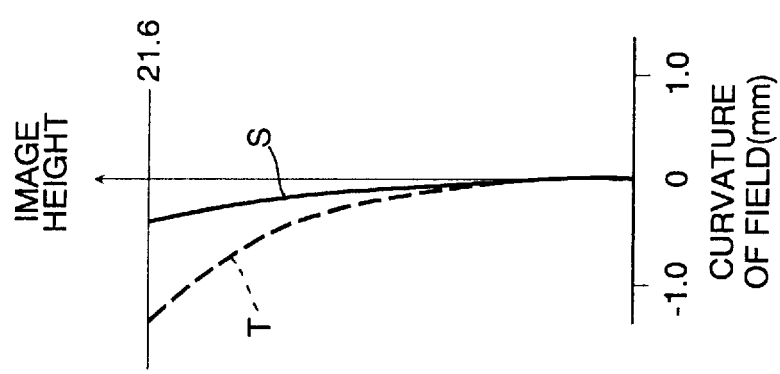
FIG. 12B is a diagram showing curvature of field in sagittal (S) and tangential (T) image surfaces of the zoom lens described in Table IV at the middle equivalent focal length.
Figure 12A:
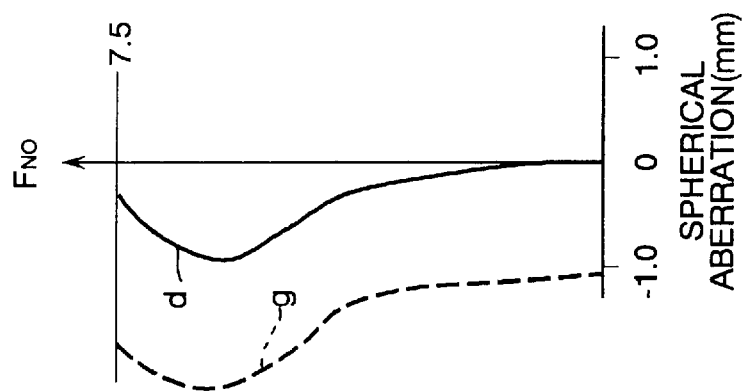
FIG. 12A is a diagram showing spherical aberrations of the zoom lens described in Table IV at the middle equivalent focal length.
Figure 13C:
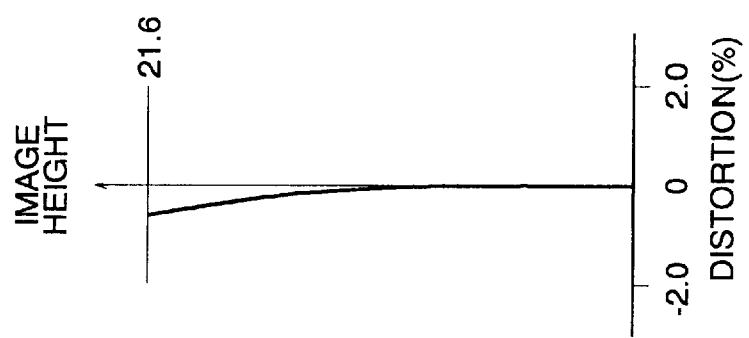
FIG. 13C is a diagram showing distortion of the zoom lens described in Table IV at the telephoto end or the longest equivalent focal length.
Figure 13B:
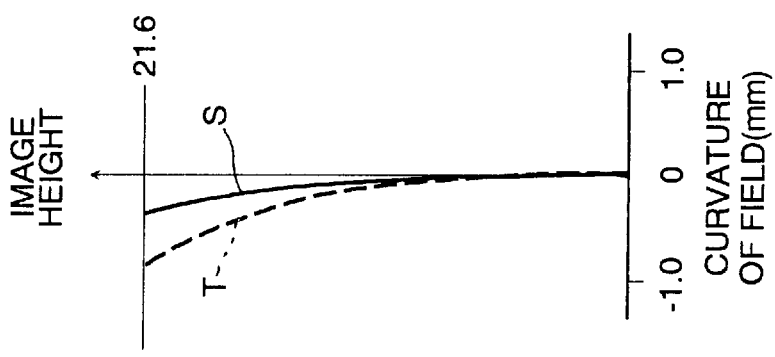
FIG. 13B is a diagram showing curvature of field in sagittal (S) and tangential (T) image surfaces of the zoom lens described in Table IV at the telephoto end or the longest equivalent focal length.
Figure 13A:
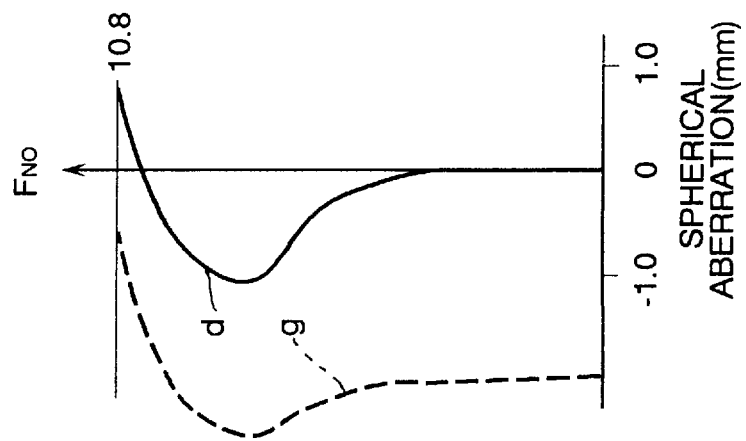
FIG. 13A is a diagram showing spherical aberrations of the zoom lens described in Table IV at the telephoto end or the longest equivalent focal length.

As shown in FIGS. 2 through 13, in which labels S and T indicate the curvature of field in a sagittal image surface and a tangential image surface, respectively, the zoom lens of each embodiment of the invention suitably balances the aberrations when focused across the intended broad range between the wide angle end and telephoto end.

The simplified zoom lenses exemplified in Tables I through IV have the axial distance between surfaces of the first lens element $L_1$ and the radius of curvature of each lens surface set in the predetermined extent to satisfy the necessary conditions for compactness and low production costs with the effect of well balanced aberrations. Forming aspheric surfaces on only one of the first and second lens elements $L_1$ and $L_2$ contributes to a reduction in production costs of the simplified zoom lens. Furthermore, forming both first and second lens elements $L_1$ and $L_2$ as plastic lenses contributes to a reduction in production costs of the simplified zoom lens.

It may thus be seen that the simplified zoom lenses of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A zoom lens consisting of only two lens elements, namely, from an object end, a first lens element $L_1$ of positive refractive power which consists of a meniscus lens having a convex image side surface, and a second lens element $L_2$ of negative refractive power which has an object side surface that is concave relative to the object end and an image side surface that is convex relative to the image end and wherein a curvature on the object side surface is larger than on the image side surface, said first lens element $L_1$ and said second lens element $L_2$ being movable relative to each other to vary the focal length of the zoom lens, said zoom lens satisfying the following relations:

$$0.05 < d_1/f_W < 0.20$$

$$-0.25 < R_2/f_W < -0.15$$

$$-0.65 < R_3/f_W < -0.35$$

where $d_1$ is the axial distance between the surfaces of the first lens element $L_1$ along an optical axis X of the zoom lens;

$f_W$ is the focal length at the wide angle end of the whole zoom lens;

$R_2$ is the radius of curvature of the image side surface of the first lens element $L_1$; and $R_3$ is the radius of curvature of the object side surface of the second lens element $L_2$.

2. A zoom lens as defined in claim 1, wherein said first lens element has aspheric surfaces at both sides, and said second lens element has spherical surfaces at both sides.

3. A zoom lens as defined in claim 2, wherein said aspheric surfaces are defined by the following relation:

$$Z = CY^2/\{1+(1-[1+K]C^2Y^2)^{1/2}\} + A_2Y^4 + A_3Y^6 + A_4Y^8 + A_5Y^{10}$$

where

Z is the surface sag at a semi-aperture distance from the optical axis X of the zoom lens;

C is the curvature of a lens surface at the optical axis X;

K is a conic constant; and $A_2$, $A_3$, $A_4$ and $A_5$ are aspheric coefficients.

4. A zoom lens as defined in claim 2, wherein each of said first lens element $L_1$ and said second lens element $L_2$ is made of plastic.

5. A zoom lens as defined in claim 3 scaled to an equivalent focal length of 32.804 mm to 54.085 mm described substantially as follows:

| Element | Surface | Radius(mm) | Axial Distance Between Surfaces | $N_d$ | $U_d$ |
|---|---|---|---|---|---|
| $L_1$ | S1 | $R_1 = -9.3662$ |  |  |  |
|  |  |  | $d_1 = 3.500$ | 1.49023 | 57.6 |
|  | S2 | $R_2 = -5.9102$ |  |  |  |
|  |  |  | $d_2 = 18.050$ to $6.850$ |  |  |
| $L_2$ | S3 | $R_3 = -18.1506$ |  |  |  |
|  |  |  | $d_3 = 2.125$ | 1.53522 | 40.6 |
|  | S4 | $R_4 = -171.8729$ |  |  |  |

Aspheric Surface: S1 and S2
Aspheric Coefficients:

|  | S1 | S2 |
|---|---|---|
| $A_2$ | $-3.4437 \times 10^{-4}$ | $5.0877 \times 10^{-5}$ |
| $A_3$ | $8.0329 \times 10^{-10}$ | $-2.6558 \times 10^{-9}$ |
| $A_4$ | $0.0010 \times 10^{-15}$ | $-2.2455 \times 10^{-15}$ |
| $A_5$ | $4.4926 \times 10^{-20}$ | $6.2577 \times 10^{-19}$ |

-continued

Conic Constant:

| | K | 5.8614 | 0.4616 |
|---|---|---|---|

Curvature:

| | C | −0.106767 | −0.169200 |
|---|---|---|---| where the reference radius numbers $R_x$ are the progressive lens surface radii, positive surface radii are struck from the right of the lens surface on the optical axis X, negative radii are struck from the left of the lens surface on the optical axis X, $N_d$ is the index of refraction of the lens element, $u_d$ is the dispersion of the lens element as measured by the Abbe number, and the reference distance numbers $d_x$ are the progressive axial distances between adjacent lens surfaces.

6. A zoom lens as defined in claim 3 scaled to an equivalent focal length of 28.949 mm to 49.036 mm described substantially as follows:

| Element | | Surface Radius(mm) | Axial Distance Between Surfaces | $N_d$ | $U_d$ |
|---|---|---|---|---|---|
| $L_1$ | S1' | $R_1 = -7.6119$ | $d_1 = 2.500$ | 1.49023 | 57.6 |
| | S2' | $R_2 = -5.0130$ | | | |
| | | | $d_2 = 17.750$ to $6.250$ | | |
| $L_2$ | S3 | $R_3 = -16.6158$ | $d_3 = 2.000$ | 1.53522 | 40.6 |
| | S4 | $R_4 = -132.2790$ | | | |

Aspheric Surface: S1 and S2
Aspheric Coefficients:

| | S1 | S2 |
|---|---|---|
| $A_2$ | $7.4641 \times 10^{-5}$ | $3.0795 \times 10^{-4}$ |
| $A_3$ | $-1.2925 \times 10^{-4}$ | $-1.0673 \times 10^{-4}$ |
| $A_4$ | $-1.9060 \times 10^{-6}$ | $1.2361 \times 10^{-5}$ |
| $A_5$ | $-2.2388 \times 10^{-8}$ | $-5.7955 \times 10^{-7}$ |

Conic Constant:

| | K | 5.8727 | 0.5102 |
|---|---|---|---|

Curvature:

| | C | −0.131373 | −0.199481 |
|---|---|---|---| where the reference radius numbers $R_x$ are the progressive lens surface radii, positive surface radii are struck from the right of the lens surface on the optical axis X, negative radii are struck from the left of the lens surface on the optical axis X, $N_d$ is the index of refraction of the lens element, $u_d$ is the dispersion of the lens element as measured by the Abbe number, and the reference distance numbers $d_x$ are the progressive axial distances between adjacent lens surfaces.

7. A zoom lens as defined in claim 3 scaled to an equivalent focal length of 31.999 mm to 53.998 mm described substantially as follows:

| Element | | Surface Radius(mm) | Axial Distance Between Surfaces | $N_d$ | $U_d$ |
|---|---|---|---|---|---|
| $L_1$ | S1 | $R_1 = -12.9860$ | $d_1 = 5.000$ | 1.49023 | 57.6 |
| | S2 | $R_2 = -7.0713$ | | | |
| | | | $d_2 = 19.211$ to $6.850$ | | |
| $L_2$ | S3 | $R_3 = -19.0510$ | $d_3 = 2.125$ | 1.53522 | 40.6 |
| | S4 | $R_4 = -216.2229$ | | | |

Aspheric Surface: S1 and S2
Aspheric Coefficients:

| | S1 | S2 |
|---|---|---|
| $A_2$ | $-3.3939 \times 10^{-4}$ | $1.7389 \times 10^{-4}$ |
| $A_3$ | $2.6398 \times 10^{-5}$ | $1.4162 \times 10^{-6}$ |
| $A_4$ | $-1.1620 \times 10^{-5}$ | $-2.2455 \times 10^{-15}$ |
| $A_5$ | $7.9416 \times 10^{-7}$ | $1.2614 \times 10^{-8}$ |

Conic Constant

| | K | 5.9701 | 0.6652 |
|---|---|---|---|

Curvature

| | C | −0.077006 | −0.141412 |
|---|---|---|---| where the reference radius numbers $R_x$ are the progressive lens surface radii, positive surface radii are struck from the right of the lens surface on the optical axis X, negative radii are struck from the left of the lens surface on the optical axis X, $N_d$ is the index of refraction of the lens element, $u_d$ is the dispersion of the lens element as measured by the Abbe number, and the reference distance numbers $d_x$ are the progressive axial distances between adjacent lens surfaces.

8. A zoom lens as defined in claim 3 scaled to an equivalent focal length of 29.000 mm to 53.999 mm described substantially as follows:

| Element | | Surface Radius(mm) | Axial Distance Between Surfaces | $N_d$ | $U_d$ |
|---|---|---|---|---|---|
| $L_1$ | S1 | $R_1 = -14.1534$ | $d_1 = 5.000$ | 1.49023 | 57.6 |
| | S2 | $R_2 = -6.5630$ | | | |
| | | | $d_2 = 15.385$ to $6.850$ | | |
| L2 | S3 | $R_3 = -11.8374$ | $d_3 = 2.125$ | 1.49023 | 57.6 |
| | S4 | $R_4 = -170.7822$ | | | |

Aspheric Surface: S1 and S2
Aspheric Coefficients:

| | S1 | S2 |
|---|---|---|
| $A_2$ | $-5.8333 \times 10^{-4}$ | $2.5623 \times 10^{-4}$ |
| $A_3$ | $4.3322 \times 10^{-5}$ | $-5.3181 \times 10^{-7}$ |
| $A_4$ | $-1.1704 \times 10^{-5}$ | $-2.2455 \times 10^{-15}$ |
| $A_5$ | $3.2780 \times 10^{-7}$ | $3.5746 \times 10^{-8}$ |

Conic Constant:

| | K | 8.0831 | 0.7070 |
|---|---|---|---|

Curvature:

| | C | −0.070654 | −0.152369 |
|---|---|---|---| where the reference radius numbers $R_x$ are the progressive lens surface radii, positive surface radii are struck from the right of the lens surface on the optical axis X, negative radii are struck from the left of the lens surface on the optical axis X, $N_d$ is the index of refraction of the lens element, $u_d$ is the dispersion of the lens element as measured by the Abbe number, and the reference distance numbers $d_x$ are the progressive axial distances between adjacent lens surfaces.

9. A zoom lens consisting of only two lens elements, namely, from an object end,
a first lens element of positive refractive power which consists of a meniscus lens having aspheric surfaces at both sides thereof and a convex image side surface, and
a second lens element of negative refractive power having spherical surfaces at both sides thereof and an object side surface that is concave relative to the object end and an image side surface that is convex relative to the image end and wherein a curvature of the object side surface is larger than that of the image side surface, said first lens element and said second lens element being movable relative to each other to vary a focal length of the zoom lens.

10. A zoom lens comprising, from an object end a first lens element $L_1$ of positive refractive power which consists of a meniscus lens having aspheric surfaces at both sides thereof and a convex image side surface, and a second lens element $L_2$ of negative refractive power having spherical surfaces at both sides thereof and which has an object side surface that is concave relative to the object end and an image side surface that is convex relative to the image end and wherein a curvature of the object side surface is larger than that of the image side surface, said first lens element $L_1$ and said second lens element $L_2$ being movable relative to each other to vary the focal length of the zoom lens, said zoom lens satisfying the following relations:

$0.05 < d_1/f_w < 0.20$ $-0.25 < R_2/f_w < -0.15$ $-0.65 < R_3/f_w < -0.35$ where $d_1$ is the axial distance between the surfaces of the first lens element $L_1$ along an optical axis X of the zoom lens;

$f_w$ is the focal length at the wide angle end of the whole zoom lens;

$R_2$ is the radius of curvature of the image side surface of the first lens element $L_1$; and $R_3$ is the radius of curvature of the object side surface of the second lens element $L_2$.

* * * * *